(12) United States Patent
de la Torre

(10) Patent No.: US 12,210,611 B2
(45) Date of Patent: *Jan. 28, 2025

(54) SYSTEM AND METHOD FOR FACIAL RECOGNITION AUTHENTICATION FOR MASK WEARERS

(71) Applicant: Santa Clara Holdings LLC, Dallas, TX (US)

(72) Inventor: Ralph de la Torre, Dallas, TX (US)

(73) Assignee: Santa Clara Holdings LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,754

(22) Filed: Sep. 22, 2023

(65) Prior Publication Data

US 2024/0012901 A1 Jan. 11, 2024

Related U.S. Application Data

(63) Continuation of application No. 17/190,209, filed on Mar. 2, 2021, now Pat. No. 11,822,639.

(Continued)

(51) Int. Cl.
*G06F 21/00* (2013.01)
*G06F 21/32* (2013.01)
(Continued)

(52) U.S. Cl.
CPC .............. *G06F 21/44* (2013.01); *G06F 21/32* (2013.01); *G06K 7/1417* (2013.01);
(Continued)

(58) Field of Classification Search
CPC .. G06F 21/44; G06F 21/32; G06F 2221/2137; G06F 21/36; G06F 2221/2113;
(Continued)

(56) References Cited

U.S. PATENT DOCUMENTS 10,984,225 B1 4/2021 Ghosh et al.
11,520,871 B2 12/2022 Nicol, II et al.
(Continued)

FOREIGN PATENT DOCUMENTS

| CN | 106330464 A | 1/2017 |
| CN | 111444894 A | 7/2020 |
| KR | 20160087167 A | 7/2016 |

OTHER PUBLICATIONS

International Search Report and Written Opinion for PCT Application No. PCT/US2021/047058, dated Dec. 14, 2021.

(Continued)

*Primary Examiner* — William A Corum, Jr.
(74) *Attorney, Agent, or Firm* — Locke Lord LLP; Christopher J. Capelli

(57) ABSTRACT

A system and method for authenticating a face mask with a user for providing secure access to a user device whereby received on the user device is a request from the user to pair a user face mask having a pre-printed unique identifier with the user device for user authentication purposes. The user device captures an image of the pre-printed unique identifier on the user face mask so as to associate the captured image of the unique identifier with the user device. Afterwards, when the user requests access to the user device in a locked state, the user device is caused to capture of an image of the unique identifier affixed to the user face mask. The user device may further be caused to capture an image of at least a portion of the user's face to authenticate the captured unique identifier affixed to the user face mask with the captured portion of the user's face to verify the captured unique identifier and the captured portion of the user's face are associated with the user device.

20 Claims, 7 Drawing Sheets

Related U.S. Application Data

(60) Provisional application No. 63/076,198, filed on Sep. 9, 2020.

(51) Int. Cl.
    *G06F 21/44*         (2013.01)
    *G06K 7/14*          (2006.01)
    *G06V 40/16*        (2022.01)
    *H04W 4/021*       (2018.01)
    *H04W 12/50*       (2021.01)

(52) U.S. Cl.
    CPC .......... *G06V 40/165* (2022.01); *G06V 40/172* (2022.01); *H04W 4/021* (2013.01); *H04W 12/50* (2021.01); *G06F 2221/2137* (2013.01)

(58) Field of Classification Search
    CPC .. G06K 7/1417; G06V 40/165; G06V 40/172; H04W 4/021; H04W 12/50; H04W 12/06; H04W 12/33; H04W 12/64; H04W 12/77; H04L 63/0861
    See application file for complete search history.

(56) References Cited

U.S. PATENT DOCUMENTS

| | | |
|---|---|---|
| 2008/0156879 A1 | 7/2008 | Melick et al. |
| 2008/0313939 A1 | 12/2008 | Ardill |
| 2014/0261430 A1 | 9/2014 | Davis |
| 2015/0227946 A1 | 8/2015 | Huang |
| 2015/0302421 A1 | 10/2015 | Caton et al. |
| 2018/0157813 A1* | 6/2018 | Rodrigs ................ G06V 40/13 |
| 2021/0326579 A1 | 10/2021 | Harris |
| 2022/0044007 A1* | 2/2022 | Saleh ................... G06V 40/161 |
| 2022/0067132 A1* | 3/2022 | Learmonth .......... G06V 40/161 |

OTHER PUBLICATIONS

International Preliminary Report on Patentability for PCT Application No. PCT/US2021/047058, dated Dec. 14, 2021.

Extended European Search Report for European Patent Application No. EP21867346.5, dated Jul. 7, 2024.

\* cited by examiner

SYSTEM AND METHOD FOR FACIAL RECOGNITION AUTHENTICATION FOR MASK WEARERS

CROSS REFERENCE TO RELATED APPLICATIONS

This application is a Continuation of U.S. patent application Ser. No. 17/190,209 filed Mar. 2, 2021, which claims priority to U.S. Patent Application No. 63/076,198, which is incorporated herein by reference in its entirety.

FIELD OF THE INVENTION

The disclosed embodiments generally relates to authenticating a user when wearing a mask, and more particularly, to using a barcode affixed to a face mask to facilitate user authentication associated with secure access to a computing device.

BACKGROUND OF THE INVENTION

As the Covid 19 pandemic has forced the wearing of masks or other face coverings it has exposed a problem with the prevalent use of facial identification to authenticate PC's, mobile phones, tablets and a myriad of other devices. Due to the usage of masks, facial identification algorithms currently are not functional to require that the user remove the mask to gain access to the device to which they are interacting when using facial identification techniques. Removing the mask is cumbersome to do on a regular basis and increases chances of exposure to what the mask wearer is intending to protect against.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

A system and process that works in conjunction with, overrides or is installed directly within the authentication programs of PC's, mobile phones, tablets and other devices to read unique identification tags on a mask. These tags preferably consist of known bar code types or other unique identifiers that a computing device is capable of decoding. The system and process, in one embodiment, is configured to print unique identifiers (e.g., bar codes) configured for affixation to a face mask to be worn by a user. Alternatively, in other embodiments, unique identifiers (e.g., bar codes) are preprinted on user face masks configured for pairing with a user's device for providing secure access thereto via unique authentication matching.

Access to a user's device is preferably provided using a camera component provided on the user's device, such as a smart phone device (e.g., an iPhone™) in conjunction with a facial recognition process so as to decode the unique identifier affixed to the user face mask to verify the unique identifier is uniquely paired to the user's device for providing secure access thereto. Additionally, further authentication is provided in additional embodiments by utilizing partial facial recognition of the user when wearing a face mask in addition to recognizing the unique identifier affixed to the face mask, thus the system and method of this embodiment is enabled to perform facial recognition on a portion of the user's face not obscured by the face mask (e.g., the bridge of the nose, eyes and brow) to form a secondary layer of required data in addition to the barcode/identifier before authentication is confirmed and access is granted to the user device.

To achieve these and other advantages and in accordance with the purpose of the illustrated embodiments, in one aspect, a system and method for authenticating a face mask with a user for providing secure access to a user device is described in which received on the user device is a request from the user to pair a user face mask having a pre-printed unique identifier, (e.g., a bar code) with the user device for user authentication purposes. The user device captures an image of the pre-printed unique identifier on the user face mask so as to associate the captured image of the unique identifier with the user device. Afterwards, when the user requests access to the user device in a locked state (e.g., to unlock a smartphone or networked computing device), the user device is caused to capture of an image of the unique identifier affixed to the user face mask. In additional embodiments, the user device is further caused to capture an image of at least a portion of the user's face (preferably consisting of a portion not obscured by the worn face mask). The user device is then configured to authenticate the captured unique identifier affixed to the user face mask, and in some embodiments, also the captured portion of the user's face, so as to confirm/verify the captured unique identifier and the captured portion of the user's face are associated with the user device. Access is then provided to the user's device upon authentication of the captured unique identifier affixed to the user face mask, and in some embodiments, also the at least a captured portion of the user's face. It is noted that in some embodiments, only the capturing and authentication of the unique identifier affixed to the user face mask is required for providing access to the user's device, thus the capturing of at least a portion of the user's face is not required.

In further, optional aspects, a system and method for printing unique identifiers for face mask affixation, and authenticating a face mask with a user for providing secure access to a user device, is described in which a request is preferably made on a user's device to generate a unique identifier (e.g., a barcode) that is to be associated with the user and configured to be affixed to a user's face mask. The user's device then causes the requested unique identifier to be generated and printed, wherein the printed unique identifier is associated with (paired to) the user's device. The unique identifier is then preferably affixed to the user's face mask. Afterwards, when the user requests access to the user device in a locked state (e.g., to unlock a smartphone or networked computing device), the user device is caused to capture of an image of the generated unique identifier affixed to the user face mask. In additional embodiments, the user device is further caused to capture an image of at least a portion of the user's face (preferably consisting of a portion not obscured by the worn face mask). The user device is then configured to authenticate the captured unique identifier affixed to the user face mask, and in some embodiments, also the captured portion of the user's face, so as to confirm/verify the captured unique identifier and the captured portion of the user's face are associated with the user device. Access is then provided to the user's device upon authentication of the captured unique identifier affixed to the user face mask and the at least a captured portion of the user's face. It is noted that in some embodiments, only the capturing and authentication of the generated unique identifier affixed to the user face mask is required for providing access to the user's device, thus the capturing of at least a portion of the user's face is not required.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
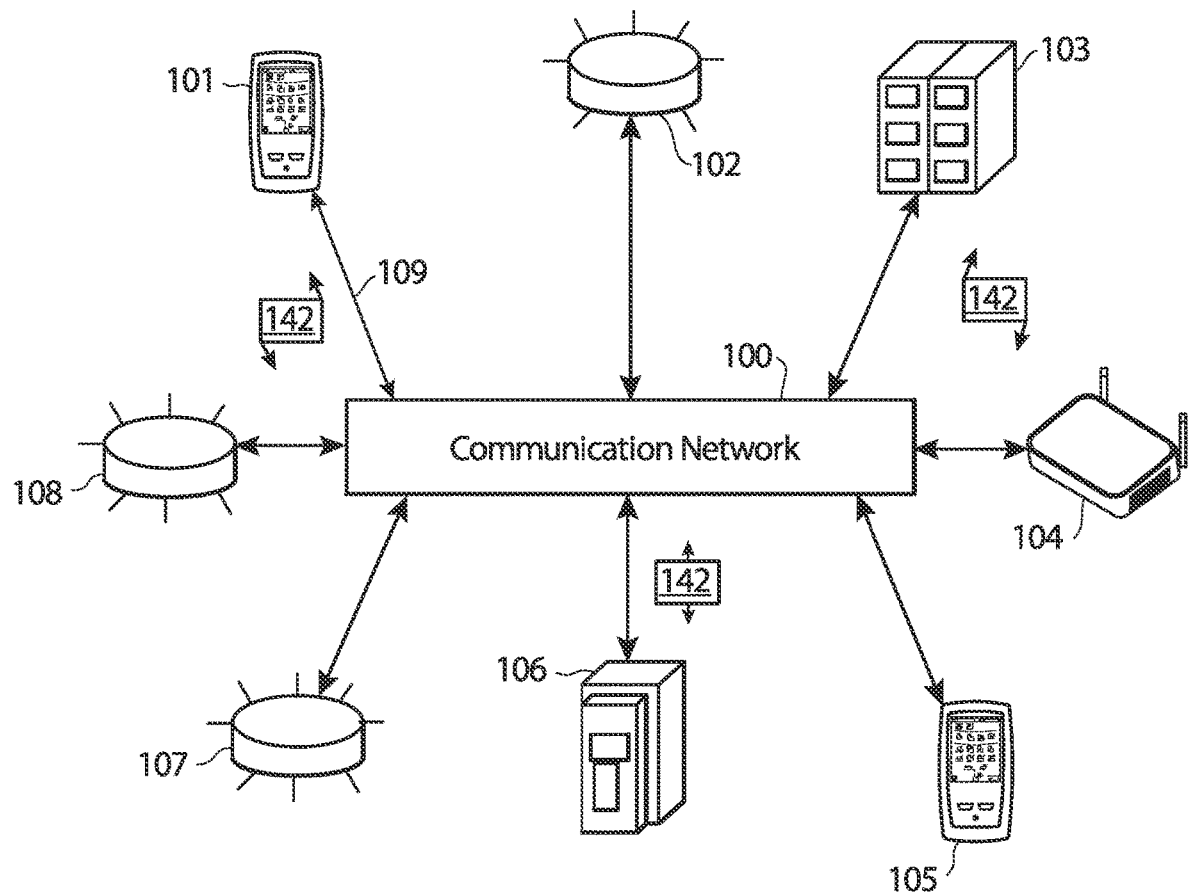
FIG. 1 illustrates an exemplary system overview and data-flow for use with an illustrated embodiment for depicting system operation.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/user devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the illustrated embodiments may be embodied as a system, method or computer program product. Accordingly, aspects of the illustrated embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrated embodiments may take the form of a computer program product embodied in one or more computer readable medium(s) having computer readable program code embodied thereon.

Any combination of one or more computer readable medium(s) may be utilized. The computer readable medium may be a computer readable signal medium (e.g., such as an "app" downloadable from an app store (e.g., iTunes™)) or a computer readable storage medium. A computer readable storage medium may be, for example, but not limited to, an electronic, magnetic, optical, electromagnetic, infrared, or semiconductor system, apparatus, or device, cloud service or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, an or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrated embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrated embodiments are described below with reference to flowchart illustrations and/or block diagrams of methods, apparatus (systems) and computer program products according to embodiments of the illustrated embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
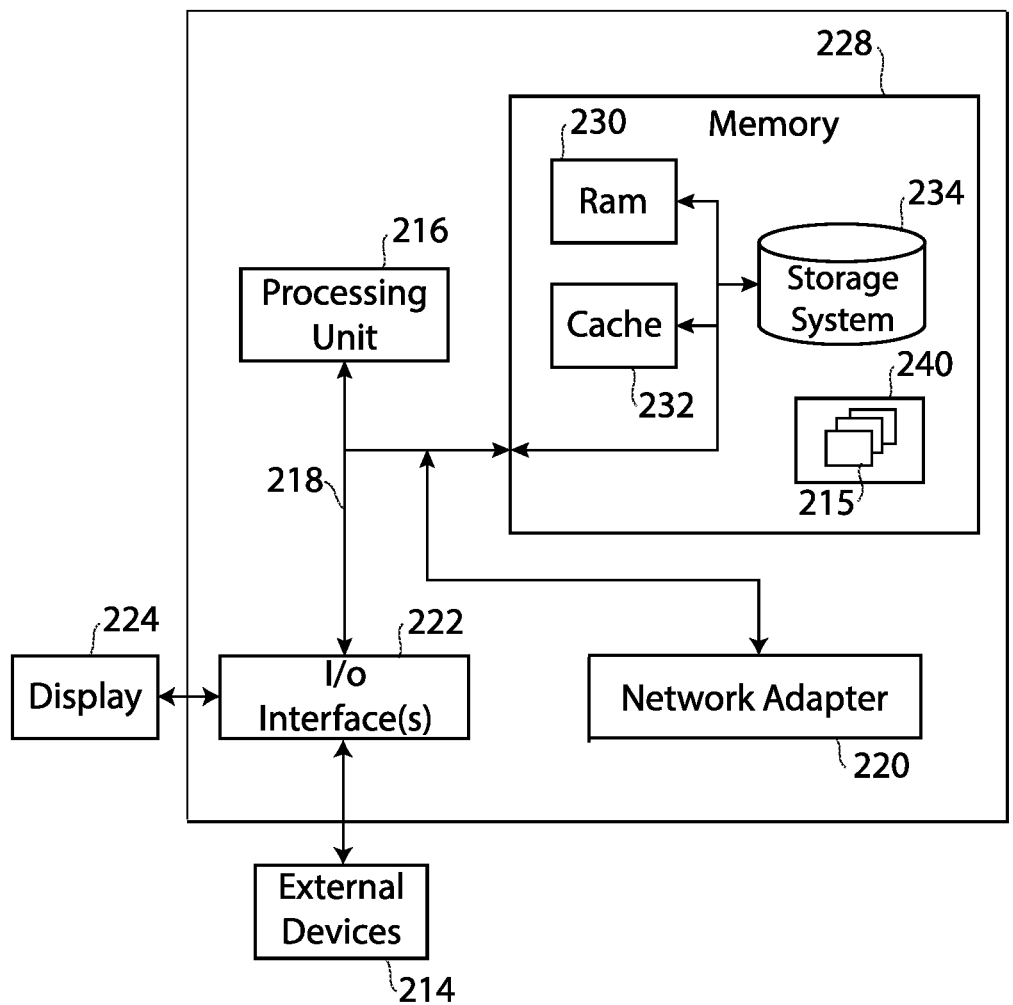
FIG. 2 illustrates an example user computing device configured in accordance with the illustrated embodiments.

With reference now to FIG. 2, shown is a schematic block diagram of an example network user computing device 200 (e.g., client computing device 103, smart phone 105, etc.) that may be used (or components thereof) with one or more illustrated embodiments described herein. As explained above, in different embodiments these various devices are configured to communicate with each other in any suitable way, such as, for example, via communication network 100.

Device 200 is intended to represent any type of user computer system capable of carrying out the teachings of various embodiments of the illustrated embodiments. Device 200 is only one example of a suitable system and is not intended to suggest any limitation as to the scope of use or functionality of embodiments of the illustrated embodiments described herein. Regardless, user device 200 is capable of being implemented and/or performing any of the functionality set forth herein.

User device 200 is operational with numerous other general purpose or special purpose computing system environments or configurations. Examples of well-known computing systems, environments, and/or configurations that may be suitable for use with computing device 200 include, but are not limited to, smart phone devices (e.g., iPhone™ and Android OS driven smart phones) personal computer systems, server computer systems, thin clients, thick clients, hand-held or laptop devices, multiprocessor systems, microprocessor-based systems, programmable consumer electronics, network PCs, minicomputer systems, and distributed data processing environments that include any of the above systems or devices, and the like.

User device 200 may be described in the general context of computer system-executable instructions, such as program modules, being executed by a computer system. Generally, program modules may include routines, programs, objects, components, logic, data structures, and so on that perform particular tasks or implement particular abstract data types. User device 200 may be practiced in distributed data processing environments where tasks are performed by remote processing devices that are linked through a communications network. In a distributed data processing environment, program modules may be located in both local and remote computer system storage media including memory storage devices.

User device 200 is shown in FIG. 2 in the form of a user computing device. The components of device 200 may include, but are not limited to, one or more processors or processing units 216, a system memory 228, and a bus 218 that couples various system components including system memory 228 to processor 216 and one or more camera components.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

User device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the illustrated embodiments as described herein.

Device 200 may also communicate with one or more external devices 214 such as a keyboard, a pointing device, one or more camera components, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as cellular networks (e.g., TDMA, CDMA, 3g, 4g and 5g); a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described illustrated embodiments may be implemented. FIGS. 1 and 2 are exemplary of a suitable environment and are not intended to suggest any limitation as to the structure, scope of use, or functionality of an embodiment of the illustrated embodiments. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
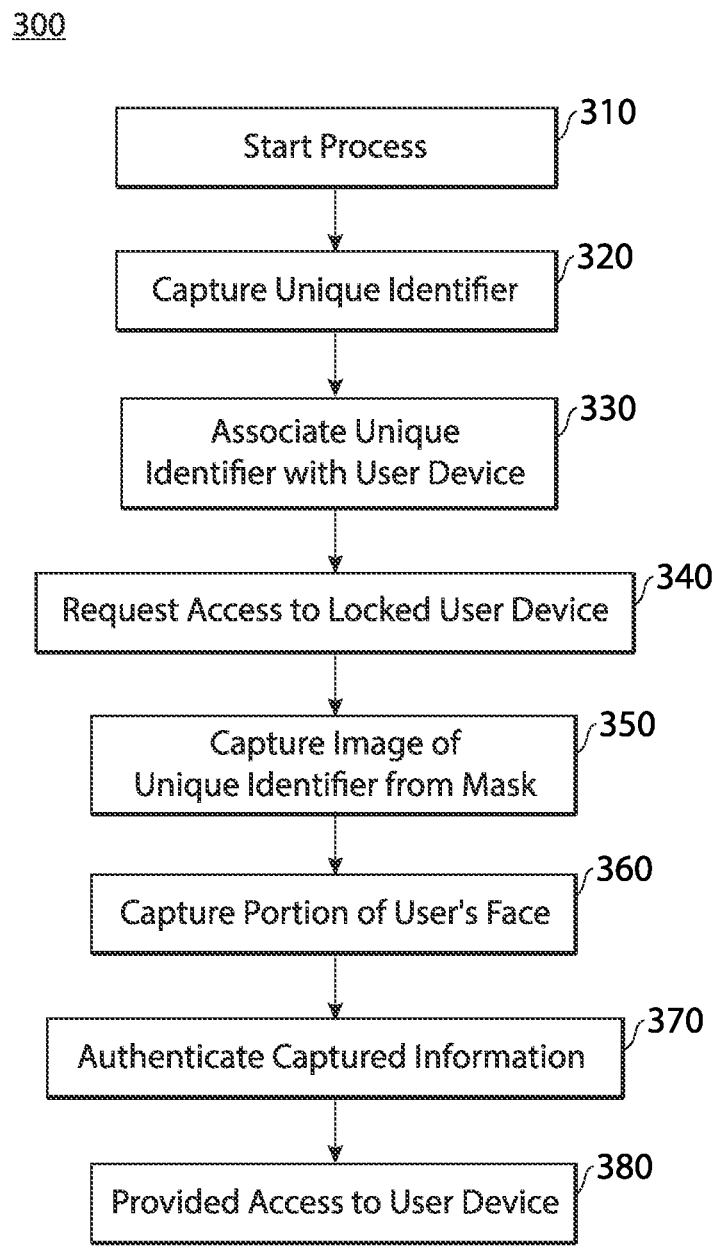
FIGS. 3 and 4 illustrate flow charts depicting operation of a user device in accordance with exemplary illustrated embodiments.
Figure 4:
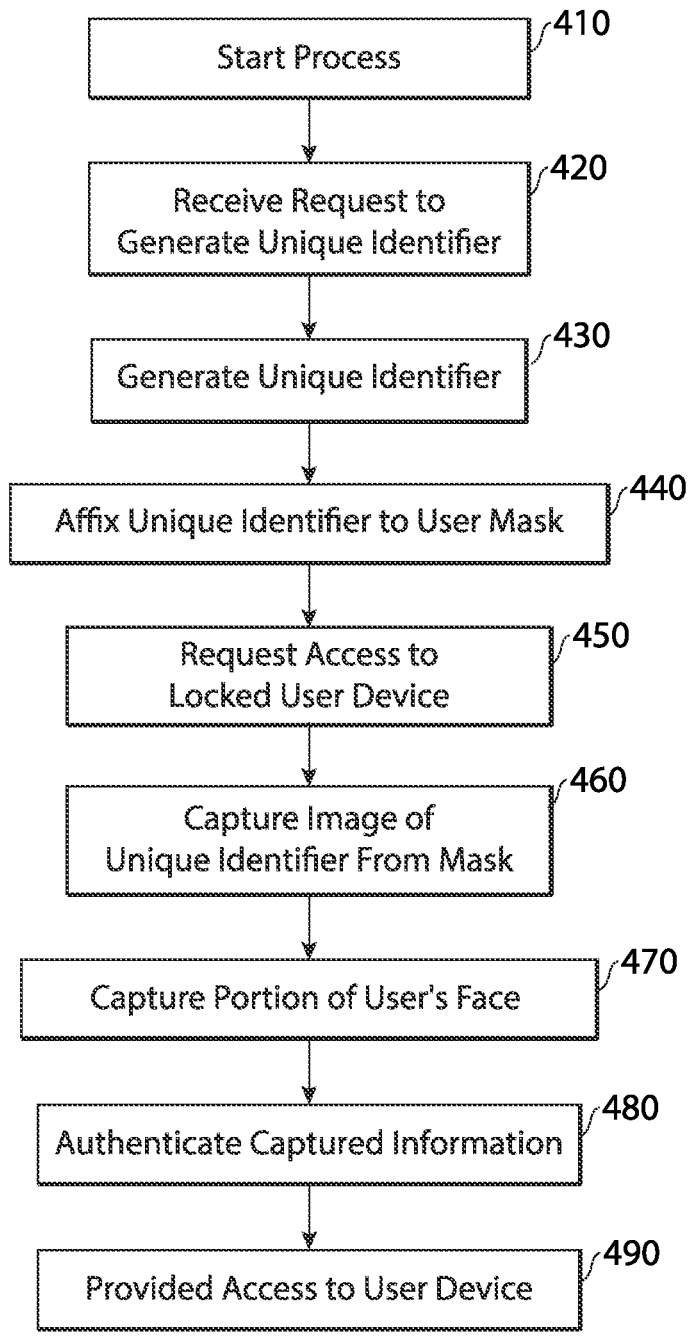

With the exemplary communication network 100 (FIG. 1) and user device 200 (FIG. 2) being generally shown and discussed above, description of certain illustrated embodiments of the present invention will now be provided. With reference now to FIG. 3, described is system and process that works in conjunction with, overrides or is installed directly within the authentication programs of computing device, networked computing devices, mobile phones, tablets and other devices to read unique identification tags on a facial mask. The unique identifiers preferably consist of known bar code types or other unique identifiers that a computing device 200 is capable of decoding. The system and process, in one illustrated embodiment (FIG. 4, process 400), is configured to print unique identifiers (e.g., bar cades) configured for affixation to a face mask to be worn by a user. Alternatively, in other embodiments (FIG. 3, process 300), unique identifiers (e.g., bar codes) are preprinted on user face masks configured for pairing with a user's device 200 for providing secure access thereto via unique authentication matching as described herein.

Access to a user's device 200 is preferably provided using a camera component provided on the user's device 200, preferably in conjunction with a facial recognition process, so as to decode the unique identifier affixed to the user face mask to verify the unique identifier is uniquely paired to the user's device 200 for providing secure access to the user device 200. Additionally, further authentication is provided in additional embodiments by utilizing partial facial recognition of the user while wearing a face mask in addition to recognizing the unique identifier affixed to the face mask. Thus the system and method of this embodiment is enabled to perform facial recognition on a portion of the user's face preferably not obscured by the face mask (e.g., the bridge of the nose, eyes and brow) to form/acquire a secondary layer of required data in addition to the barcode/identifier before authentication is confirmed and access is granted to the user device 200.

Figure 5A:
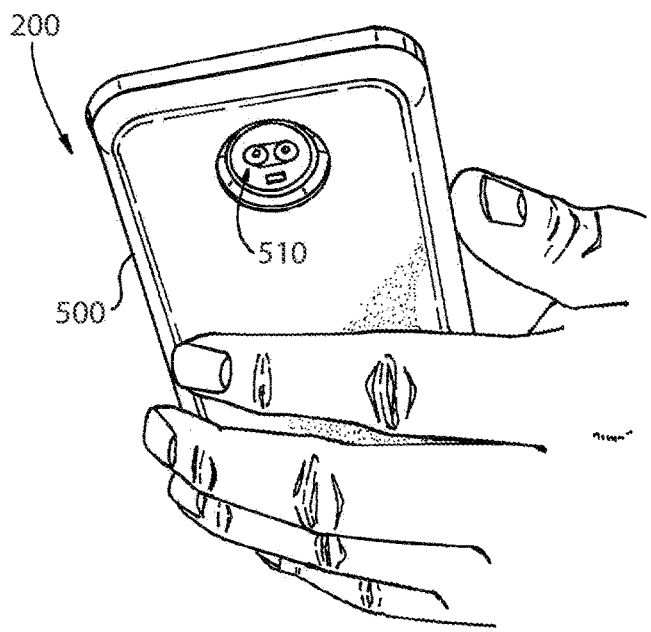
FIGS. 5A-5E illustrate various exemplary embodiments depicting usage of the illustrated embodiments of FIGS. 3 and 4.
Figure 5B:
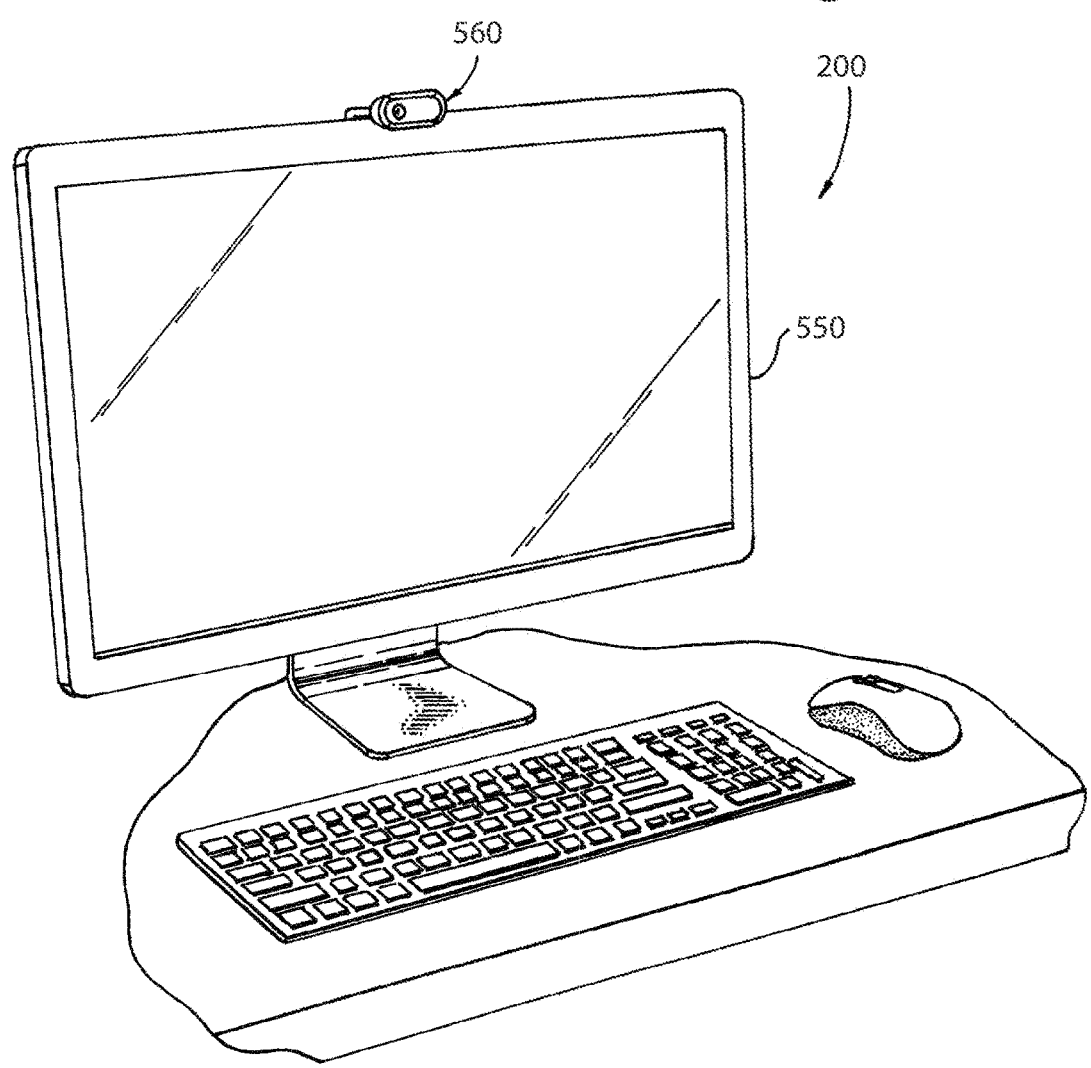

With specific reference now to FIG. 3 (and with continuing reference to user device 200 of FIG. 2) described is a system and method 300 in accordance with an illustrated embodiment for authenticating a face mask with a user for providing secure access to a user device 200 (starting at block 310). As mentioned above, the user device 200 may be a smart phone device 500 (FIG. 5A) or a networked PC/computer device 550 (FIG. 5B) (such as those installed in healthcare environments, such as a hospital), wherein the user device 200 is associated with one or more camera components for capturing images. In the case of the user device 200 being a smart phone device 500, the one or more camera components 510 are preferably integrated internally with the user device 200, and in the case the user device 200 is a network PC/computer device 550, the one or more camera components 560 may either be external peripheral devices, or integrated with a component of the PC device (e.g., a camera device (e.g., a webcam like device) provided on a screen/display component).

Figure 5C:
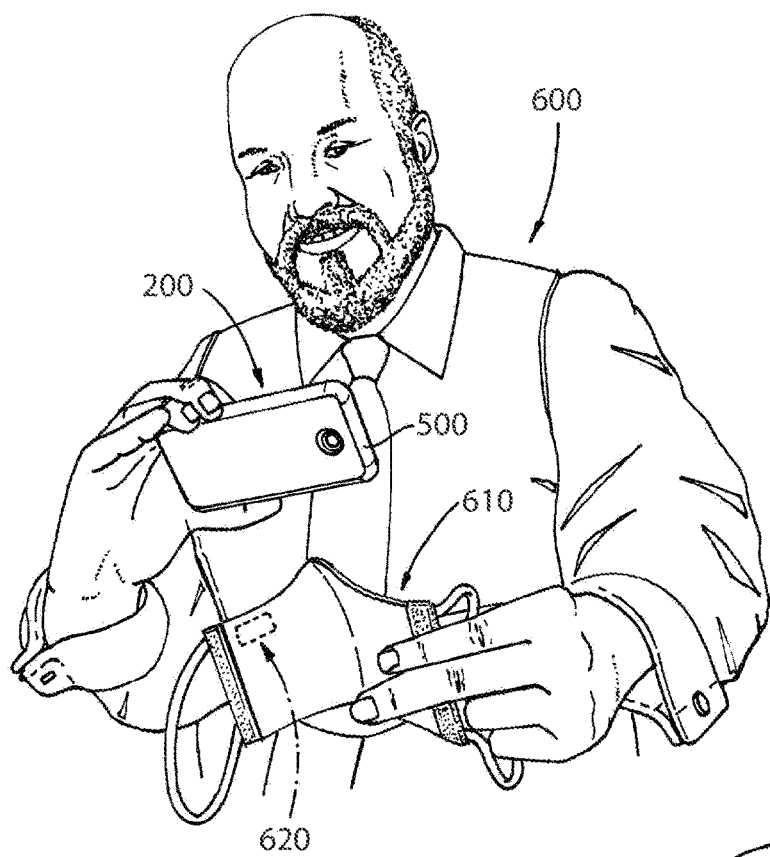

With reference now to the exemplary embodiment of FIG. 5C, at process block 320, a request is preferably made by the user of user device 200 to pair a user face mask 610 having a pre-printed unique identifier 620 with the user device 200 for user authentication purposes. It is to be appreciated, prior to initiating process 300 (or 400), a user 600 may gain access to their user device 200 (preferably when not wearing a face mask 610) by the legacy authorization processes practiced by such a user device 200 (e.g., entering a secure password and/or recognizing user biometric information (e.g., finger and/or facial recognition)). It is to be further appreciated the face mask 610 to be paired may consist of one or more of the following types of face masks (which are not to be understood to be limited thereto): 1-ply cloth mask; 2-ply cloth mask; N95 respirator type; and KN95 type. Additionally, it is to be understood the unique identifier 620 may be a barcode of one or more of the following types (and not to be understood to be limited thereto): 1D barcode; UP code; Code 128; GS1 databar; PDF417; QR code; Data matrix; and Aztec code.

Once the aforesaid process (blocks 310, 320) is initiated on the user device 200, the user device 200 preferably captures an image of a unique identifier 620 pre-printed on one or more user face masks 610 so as to associate the captured image of the one or more pre-printed unique identifiers 620 with the user device 200 (block 330). It is to be appreciated that when a plurality of unique identifiers 620 are captured from a plurality of face masks 610, the unique identifiers 620 may be identical or different relative to one another whereby each unique identifier is to be associated (e.g., paired) with the user device 200 for authentication of the user for gaining access to the user device 200 as described below.

Figure 5D:
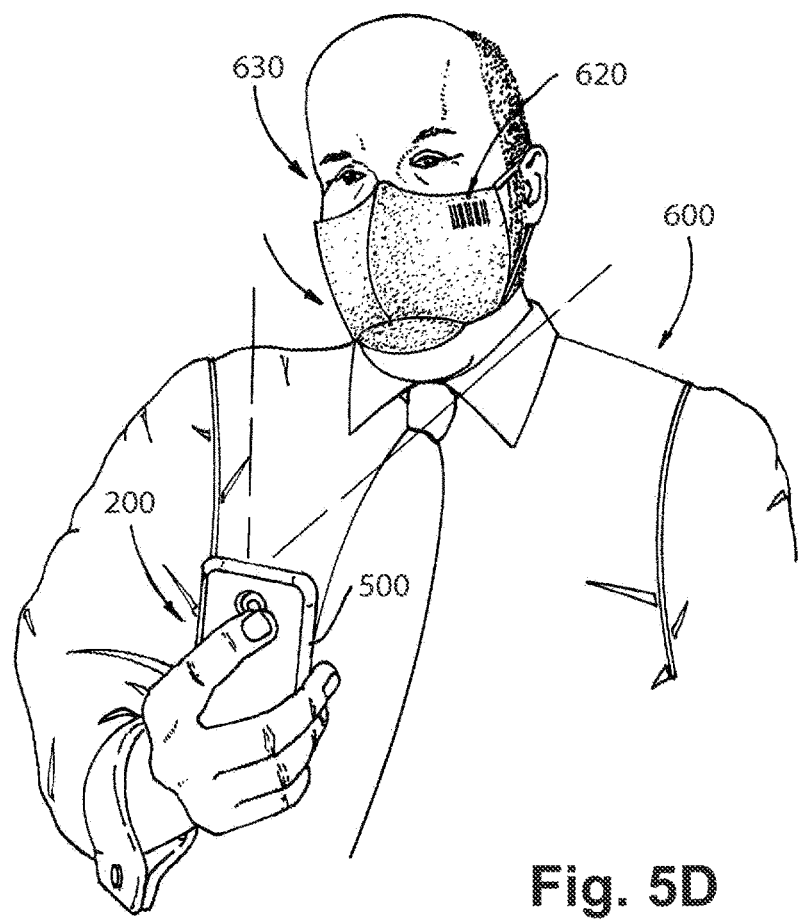

Afterwards, when the user 600 requests access to the user device 200 in a locked state (e.g., to unlock a smartphone 500 or networked computing device 550) while the user 600 is wearing a face mask 610 (block 340), the user device 200 is caused to capture of an image (via an associated camera component) of the unique identifier 620 affixed to the user face mask 610 (block 350). With reference to FIG. 5D, in some illustrated embodiments, the user device 200 is further caused to capture an image of at least a portion of the user's face 630 (preferably consisting of a portion not obscured by the worn face mask 610) (block 360). The user device 200 is then configured to authenticate the captured unique identifier 620 affixed to the user face mask 610, and the captured portion of the user's face 630 (which in some embodiments are preformed simultaneously), so as to confirm/verify the captured unique identifier 620 and the captured portion of the user's face 630 are associated with the user device 200 (block 370). Access is then provided to the user's device 200 upon authentication of the captured unique identifier 620 affixed to the user's face mask 610 and the at least a captured portion of the user's face 630 (block 380). That is, the captured image of the unique identifier 620 was determined paired to the user device 200 in addition to determining that the captured image of at least a portion of the user's face 630 was also determined paired to the user device 200.

Figure 5E:
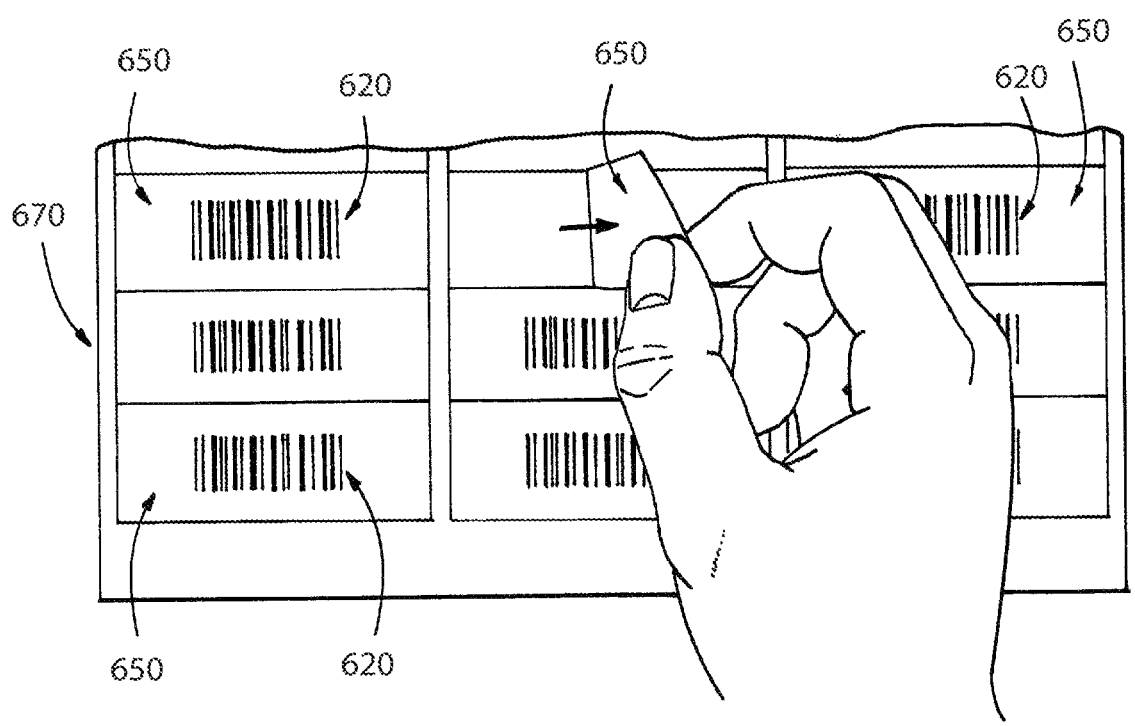

With reference now to FIG. 400, description of another illustrated embodiment is provided in which a system and method for printing unique identifiers for face mask affixation, and authenticating a face mask 610 with a user 600 for providing secure access to a user device 200 is described in accordance with process 400. Starting at block 420, a request is preferably made on a user's device 200 to generate a unique identifier 620 (e.g., a barcode) that is to be associated with the user 600 of the user device 200, which unique identifier 620 is configured for affixation to a user's face mask 610. The user's device 200 is then configured to cause the requested unique identifier 620 to be generated and printed (preferably from a printing device), wherein the printed unique identifier 620 is associated with (paired to) the user's device 200 (block 430). The unique identifier 620 is then preferably affixed to the user's face mask 610 (block 440). For instance, the aforesaid generated unique identifier 620 may be caused by user device 200 to be printed on an adhesive label 650 (FIG. 5E), preferably via a printer device, configured for affixation to a user mask 610. For instance, and as shown in FIG. 5E, a plurality of adhesive labels 650, each preferably having a unique identifier 620, may be caused to be printed on an individual sheet 670, via a printing device communicatively coupled to a user device 200.

Afterwards, when the user 600 requests access to the user device 200 in a locked state (e.g., to unlock a smartphone 500 or networked computing device 550) while the user 600 is wearing a face mask 610 (block 450), the user device 200 is caused to capture of an image (via an associated camera component) of the unique identifier 620 affixed to the user face mask 610 (block 460). In some illustrated embodiments, the user device 200 is further caused to capture an image of at least a portion of the user's face 630 (preferably consisting of a portion not obscured by the worn face mask) (block 470), as described above with reference to process 300 of FIG. 3. The user device 200 is then configured to authenticate the captured unique identifier 620 affixed to the user face mask 610, and the captured portion of the user's face 630, so as to confirm/verify the captured unique identifier 620 and the captured portion of the user's face 630 are associated with the user device 200 (block 480). Access is then provided to the user's device 200 upon authentication of the captured unique identifier 620 affixed to the user's face mask 610 and the at least a captured portion of the user's face 630 (block 490). That is, the captured image of the unique identifier 620 was determined paired to the user device 200 in addition to determining that captured image of at least a portion of the user's face 630 was also determined paired to the user device 200.

It is noted that in some embodiments, only the capturing and authentication of the unique identifier 620 affixed to the user face mask 610 is required for providing access to the user's device 200, thus the capturing of at least a portion of the user's face 630 is not required. Additionally, in some embodiments the user device 200 is preferably configured to provide a time period (which may be user determined) the unique identifier 620 is to be valid for authentication purposes (e.g., for next 24 hrs or until a certain time/date). As an additional security measure, the user device 200 may be further configured to define a geofence (preferably user determined) a unique identifier 620 is to be valid within. For instance, authentication of a user mask 610 (having a unique identifier 620) may only be valid at a certain geographic location(s) (e.g., a room, a hospital, municipalities and other geographic locations).

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computerized method for providing secure access to a user device, comprising:
   receiving, on the user device, a request from the user to pair a user face mask with a printed unique identifier;
   generating, by the user device, a unique identifier that is paired to the user's face mask; and
   printing, responsive to a signal from the user's smart phone device, the unique identifier on a label configured to be affixed to the user face mask;
   capturing, by a camera component associated with the user device, an image of the printed unique identifier; and
   pairing, by the user device, the captured image of the printed unique identifier with the user device for providing secure access to the user device.

2. The method as recited in claim 1, further including:
   requesting, by the user, access to the user device when the user device is locked;
   capturing, by the user device, the printed unique identifier affixed to the user face mask when worn by the user responsive to the user access request;
   authenticating, by the user device, the captured printed unique identifier by confirming the captured printed unique identifier is paired with the user device; and
   providing access to the user device upon authentication of the captured printed unique identifier printed on the user face mask.

3. The method as recited in claim 2, wherein the printed unique identifier is a bar code.

4. The method as recited in claim 2, further comprising providing a time period the printed unique identifier is to be valid for authentication.

5. The method as recited in claim 4, wherein the time period is user determined.

6. The method as recited in claim 1, further comprising defining a geofence the printed unique identifier is to be valid within for authentication by the user device.

7. The method as recited in claim 2, wherein the user device is a smart phone device.

8. The method as recited in claim 2, wherein the user device is selected from the group consisting of a smart phone device, tablet device, a portable computing device and a networked coupled computer device.

9. The method as recited in claim 2, wherein the user device is a networked coupled computer device.

10. The method as recited in claim 2, wherein the user face mask is selected from the group consisting of: a surgical/procedure type mask; 1-ply cloth mask; 2-ply cloth mask; N95 respirator type; and KN95 type.

11. The method as recited in claim 3, wherein the printed barcode is selected from the group consisting of the following barcode types: 1D barcode; UP code; Code 128; GS1 databar; PDF417; QR code; Data matrix; and Aztec code.

12. A smart phone device for authenticating a face mask with a user for providing secure access to a user device, comprising:
   a memory;
   a processor disposed in communication with the memory, and configured to issue a plurality of instructions stored in the memory, wherein the instructions cause the processor to:
   receive a request from the user to pair a user face mask with a printed unique identifier;
   generate, responsive to the user's request, a unique identifier that is paired to the user's face mask; and
   cause a printer coupled to the smart phone device to print the unique identifier on a label configured to be affixed to the user's face mask;
   capture by a camera component associated with the user device an image of the printed unique identifier; and
   pair the captured image of the printed unique identifier with the user device.

13. The smart phone device as recited in claim 12, wherein the processor is further configured to:
   receive a request to access to the user device when the user device is locked;
   capture by the camera component, responsive to the access request, the unique identifier printed on the label as affixed to the user's face mask when worn by the user;
   authenticate the captured printed unique identifier by confirming the captured printed unique identifier is paired with the user device; and
   provide access to the user device upon authentication of the captured printed unique identifier printed on the label affixed to the user's face mask.

14. The smart phone device as recited in claim 13, wherein the printed unique identifier is a bar code.

15. The smart phone device as recited in claim 13, wherein the processor is further configured to define a geofence the captured printed unique identifier on the label affixed to the user's face mask is to be valid within for authentication by the user device.

16. The smart phone device as recited in claim 15, wherein the geofence is user defined.

17. The computerized method as recited in claim 1, wherein the printing step further includes printing a plurality of unique identifiers on a plurality of respective labels on a label sheet.

18. The computerized method as recited in claim 17, wherein each of the plurality of printed unique identifiers is paired with one or more user face masks.

19. The smart phone device as recited in claim 12, wherein causing the printer to print the unique identifier further includes printing a plurality of unique identifiers on a plurality of respective labels on a label sheet.

20. The smart phone device as recited in claim 19, wherein each of the plurality of printed unique identifiers is paired with one or more user face masks.

* * * * *